United States Patent
Fujiwara et al.

(10) Patent No.: US 7,431,514 B2
(45) Date of Patent: Oct. 7, 2008

(54) MULTIFIBER OPTICAL CONNECTOR

(75) Inventors: Kunihiko Fujiwara, Sakura (JP); Tatsuya Ohta, Sakura (JP); Seiji Katoh, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/478,595

(22) Filed: Jul. 3, 2006

(65) Prior Publication Data
US 2006/0245695 A1 Nov. 2, 2006

(51) Int. Cl.
*G02B 6/38* (2006.01)

(52) U.S. Cl. .......................................... 385/71; 385/60

(58) Field of Classification Search .................. 385/71
See application file for complete search history.

(56) References Cited

U.S. PATENT DOCUMENTS

| 6,062,740 | A | * | 5/2000 | Ohtsuka et al. | 385/81 |
| 6,854,898 | B2 | | 2/2005 | Natori et al. | |
| 6,957,920 | B2 | | 10/2005 | Luther et al. | |
| 2004/0042733 | A1 | * | 3/2004 | Kang et al. | 385/71 |

FOREIGN PATENT DOCUMENTS

| JP | 62-104203 U | | 7/1987 |
| JP | 08-126951 | * | 5/1996 |
| JP | 8-126951 A | | 5/1996 |
| JP | 11-133269 A | | 5/1999 |
| JP | 2002-341188 A | | 11/2002 |

OTHER PUBLICATIONS

Jie Xu, Akihiro Murakami and Takashi Shigematsu, "Development of a Novel Vibration Polishing Method for Fiber Protrusion in Multi-fiber Connectors", 2003, pp. 34-38, Furukawa Review No. 24.
Jie Xu, Akihito Murakam, Takashi Shigematsu, Development of a New Polishing Method for Fiber Protrusion in Multi-fiber Connector, Furukawa Review, Japan, Jul. 2003, 112, pp. 31-35.

* cited by examiner

*Primary Examiner*—Sung Pak
*Assistant Examiner*—Chad H Smith
(74) *Attorney, Agent, or Firm*—Sughrue Mion, PLLC

(57) ABSTRACT

A multifiber optical connector is provided comprising: a ferrule including a junction-end-face and a plurality of optical-fiber-insertion holes which open in the junction-end-face; openings of the optical-fiber-insertion holes arranged on the junction-end-face in a line or row or in plural parallel lines or rows; and optical fibers received in the optical-fiber-insertion holes such that they protrude from the junction-end-face. The lengths of optical fibers disposed on both side portions of the junction-end-face are greater than the lengths of optical fibers disposed on a central portion of the junction-end-face.

4 Claims, 6 Drawing Sheets

MULTIFIBER OPTICAL CONNECTOR

CROSS-REFERENCE TO RELATED APPLICATIONS

This application is based upon Japanese Patent Application No. 2003-424049, filed on Dec. 22, 2003, in the Japanese Patent Office, the disclosure of which is incorporated herein in its entirety by reference.

BACKGROUND OF THE INVENTION

1. Field of the Invention

Devices, systems, and methods consistent with the invention relates to a multifiber optical connector which includes a ferrule having a junction-end-face and a plurality of optical-fiber-insertion holes, wherein optical fibers are received in the optical-fiber-insertion holes such that they protrude from the junction-end-face.

2. Description of the Related Art

A multifiber optical connector such as, for example, a mechanically transferable "MT"-type multifiber optical connector is known in which a plurality of optical-fiber-insertion holes are provided in a single ferrule and a plurality of optical fibers are fixed to the single ferrule such that a one-touch optical connection is made possible for a plurality of optical fibers In a multifiber optical connector of this kind, as shown in FIG. 7, an optical connection method or form is used in which mating ends 105 of optical fibers 104 are optically connected by direct contact (i.e., a physical contact "PC" connection is carried out) without using an index-matching agent on junction-end-faces 102 of ferrules 101.

When a PC connection is made, as shown in FIG. 6, each of the junction-end-faces 102 of the ferrule 101 is polished such that optical fibers 104 are received in optical-fiber-insertion holes 103 so that the optical fibers 104 protrude by several micrometers (dimension H in FIG. 6) from the junction-end-face 102. There is a rigidity (stiffness) difference between the optical fibers 104 made of a silica-based glass and the ferrules 101 formed of an epoxy resin material or the like.

As such, by wing optical fibers 104 and a ferrule 101, ends of the optical fibers 104 and ends of the ferrule 101 being substantially flush with one another, as a ferrule with optical fibers before polishing, and then by polishing entire end faces of this ferrule 101 and of the optical fibers 104, it is possible to form a junction-end-face 102 of the ferrule 101 with only the optical fibers 104 protruding therefrom.

Heretofore, a ferrule such as that shown in FIG. 6 has been used for PC connection, in which ends 105 of optical fibers 104 are arranged such that protruding lengths H by which the optical fibers (104) protrude from a junction-end-face 102 are within substantially the same level, and thereafter, a polishing operation is carried out so that a line connecting the ends of the optical fibers is substantially parallel with the junction-end-face 102.

However, even if polishing is carried out to obtain a formation such as that shown in FIG. 6, the optical fibers are apt to be polished, as shown in FIG. 8, such that polished amounts of the optical fibers 104 disposed on both side portions of the junction-end-face 102 are larger an those of the optical fibers 104 disposed on a central portion of the junction-end-face 102. Furthermore, as shown in FIG. 9, there is a case in which the surface accuracy of the junction-end-face 102 of the ferrule 101 deteriorates, and in some cases, the junction-end-face 102 does not insect orthogonally to the central axis of the ferrule 101. In such cases, there is a problem in which, when an external force is exerted on an optical connector due to vibrations or the like, a PC connection thereof is easily disconnected, and therefore, it is difficult to maintain or assure stable optical characteristics.

SUMMARY OF THE INVENTION

In view of the above, the present invention has been achieved, and it is an aspect of the present invention to provide a multifiber optical connector in which it is possible to stably maintain a PC connection in a reliable state.

Exemplary embodiments of the present invention overcome the above disadvantages and other disadvantages not described above. Also, the present invention is not required to overcome the disadvantages described above, and an exemplary embodiment of the present invention may not overcome any of the problems described above.

According to a first exemplary, but non-limiting aspect of the present invention, there is provided a multifiber optical connector, comprising: a ferrule including a junction-end-face and a plurality of optical-fiber-insertion holes which open in the junction-end-face; openings of the optical-fiber-insertion holes arranged on the junction-end-face in a line or row or in plural parallel lines or rows; and optical fibers received in the optical-fiber-insertion holes such that they protrude from the junction-end-face; wherein the lengths of the optical fibers disposed on both of side portions of the junction-end-face are greater than the lengths of optical fibers disposed on a central portion of the junction-end-face.

In accordance with a second exemplary, but non-limiting aspect of the present invention, there is provided a multifiber optical connector, comprising: a ferrule including a junction-end-face and a plurality of optical-fiber-insertion holes which open in the junction-end-face; opening of the optical-fiber-insertion holes arranged on the junction-end-face in a line or row or in plural parallel lines or rows; and optical fibers received in the optical-fiber-insertion holes such that they protrude from the junction-end-face; wherein, on the assumption that there is a reference plane which intersects orthogonally a central axis of the ferrule, which is disposed at a front side, in the connecting direction, of ends of the optical fibers, and by which positions of tips of the optical fibers are calculated and determined, the positions of the tips of the optical fibers disposed on both side portions of the junction-end-face are closer to the reference plane than the positions of the tips of the optical fibers disposed on a central portion of the junction-end-face.

A third exemplary, but non-limiting aspect of the present invention is characterized in that, in the second exemplary, but non-limiting aspect of the present invention, the optical fiber which is disposed at an outer-most end side has the tip that is closest to the reference plane among those of the remaining optical fibers.

According to the various non-limiting exemplary embodiments of the present invention, when optical connectors are connected via a PC connection, pressure forces may be easily and preferentially induced between the optical fibers opposed to one another and disposed on the both side portions of the junction faces. Therefore, the likelihood of a PC connection of the optical fibers of the side portions being not achieved may be reduced or eliminated. Furthermore, even if external forces such as vibrations are applied to the optical connector, a PC connection thereof may not be disconnected, and thus, it may be possible to maintain stable optical characteristics.

The above, and other aspects and features of the present invention will become apparent upon consideration of the

DETAILED DESCRIPTION OF THE INVENTION

Figure 1:
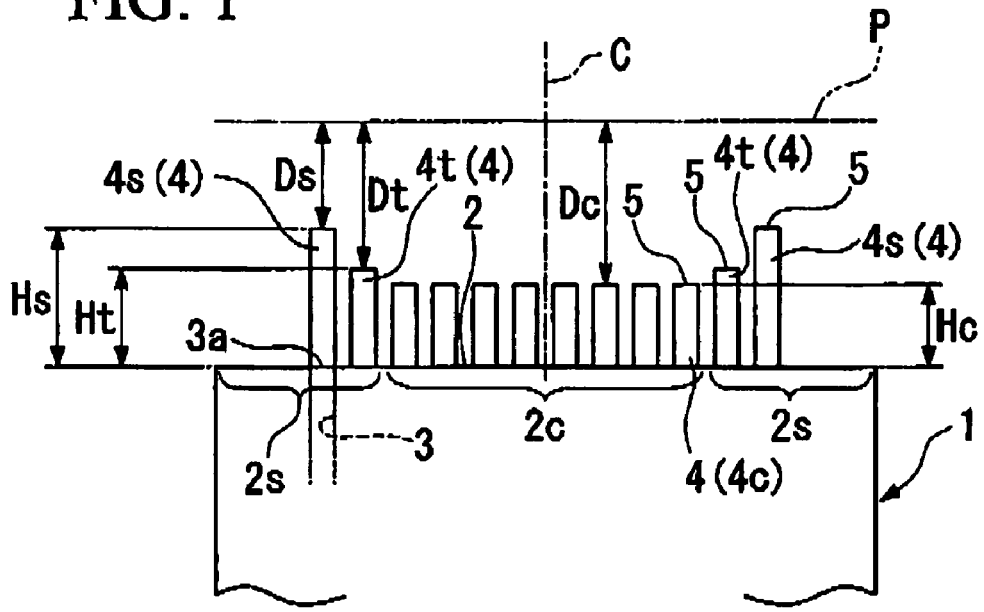
FIG. 1 is a frontal view illustrating an example of a ferrule of an exemplary non-limiting embodiment of an optical connector according to the present invention.

Exemplary non-limiting embodiments of the invention will now be described below by reference to the attached drawings. The described exemplary embodiments are intended to assist in understanding the invention, and are not intended to limit the scope of the invention in any way.

Hereinafter, a non-limiting exemplary embodiment will be described with reference to the drawings, wherein like reference numerals in the various figures we utilized to designate like components.

Figure 2:
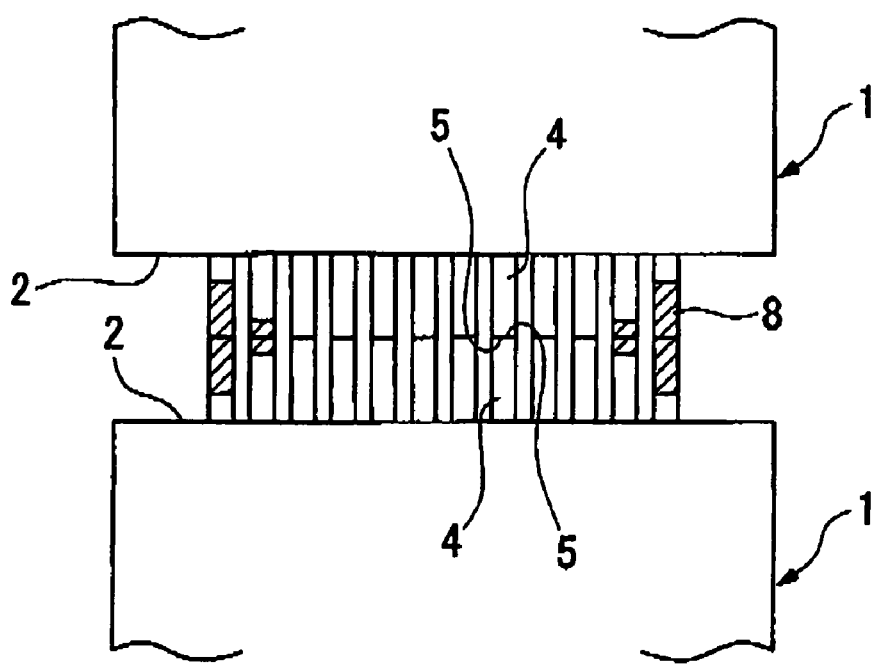
FIG. 2 is a frontal view illustrating an non-limiting exemplary state in which a PC connection is established between the ferrules of FIG. 1.

FIG. 1 is a front elevational view illustrating an exemplary, but non-limiting embodiment of a ferrule of an optical connector according to the present invention. FIG. 2 is a front elevational view illustrating an exemplary state in which the ferrule of FIG. 1 is in a physical contact (PC) connection condition.

The ferrule of the optical connector of the present non-limiting exemplary embodiment is a ferrule which is used in multifiber optical connectors of a mechanically transferable (MT) type, such as those defined in JIS C 5981 or the like. The ferrule can be made, for example, by means of an integral resin molding process or the like by using a plastic material such as a silica-filling epoxy resin, polyphenylene sulfide (PPS), polybutylene terephthalate (PBT) or the like.

Figure 3:
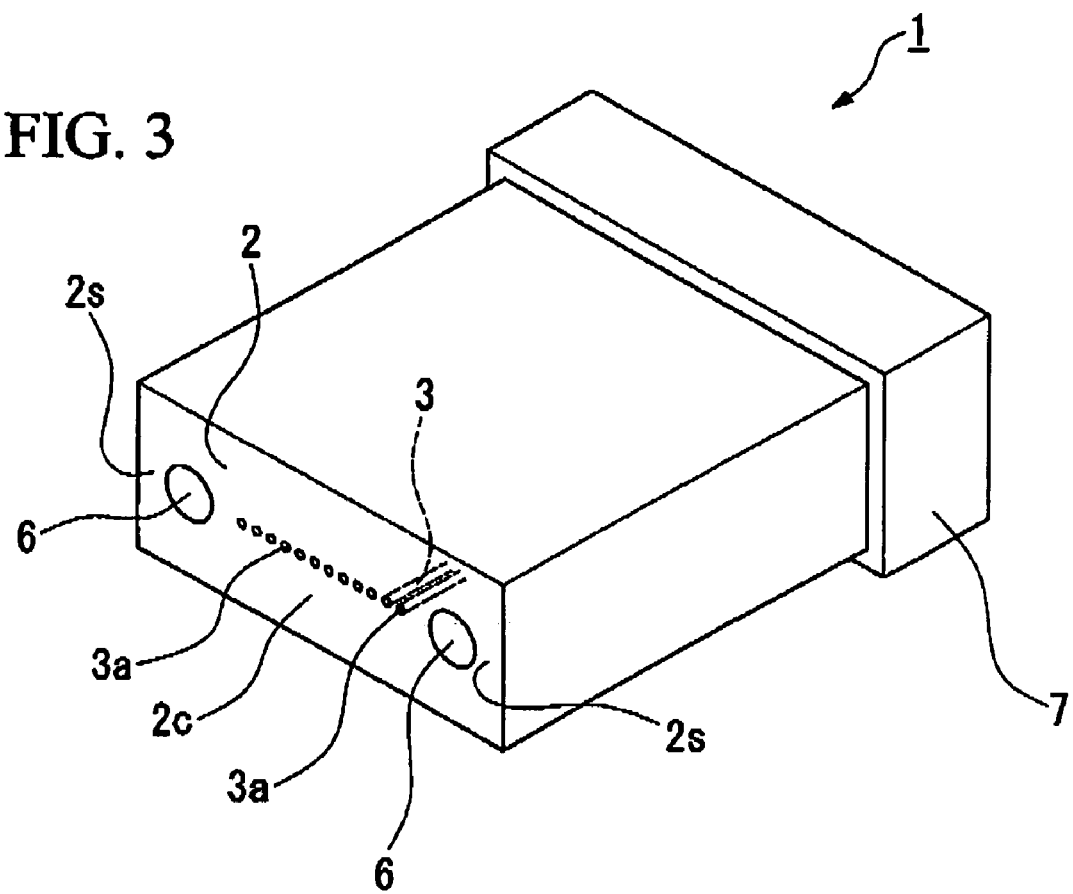
FIG. 3 is a perspective view illustrating the example of the ferrule of the optical connector according to another non-limiting exemplary embodiment of the present invention.
Figure 4:
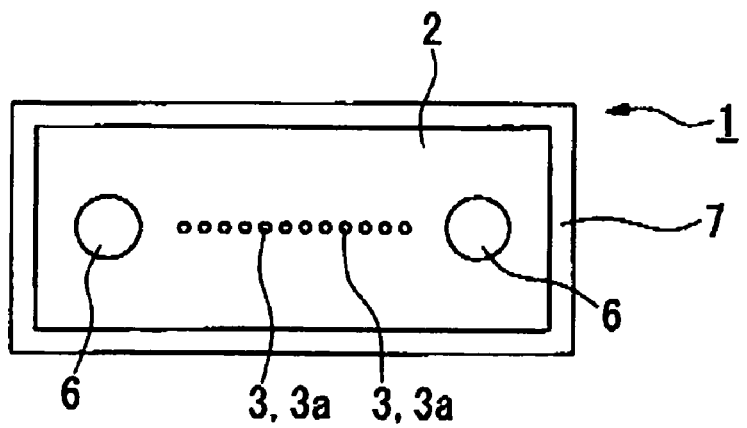
FIG. 4 is a frontal view illustrating a junction-end-face of the ferrule of FIG. 3.
Figure 5A:
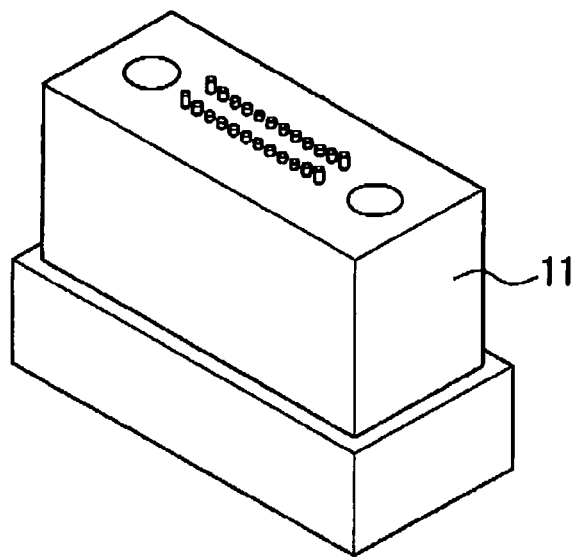
FIGS. 5A through 5D are views illustrating another example of an optical connector according to a non-limiting exemplary the present invention.
Figure 5B:
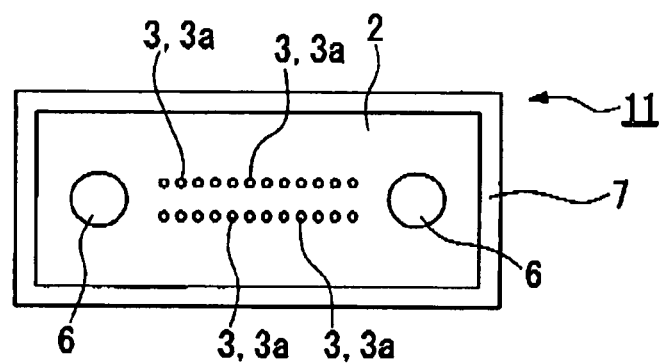
Figure 5C:
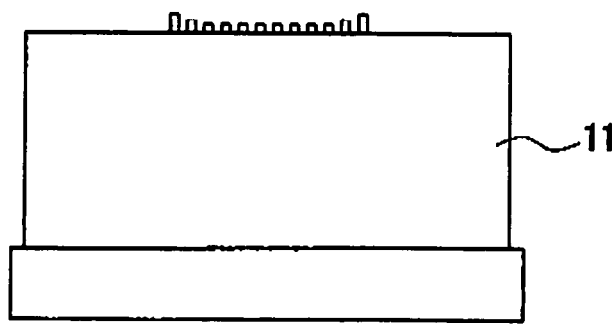
Figure 5D:
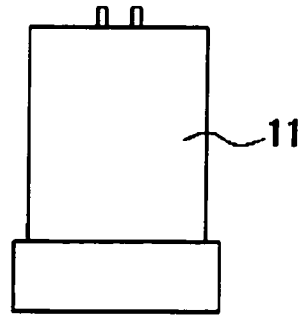
Figure 6:
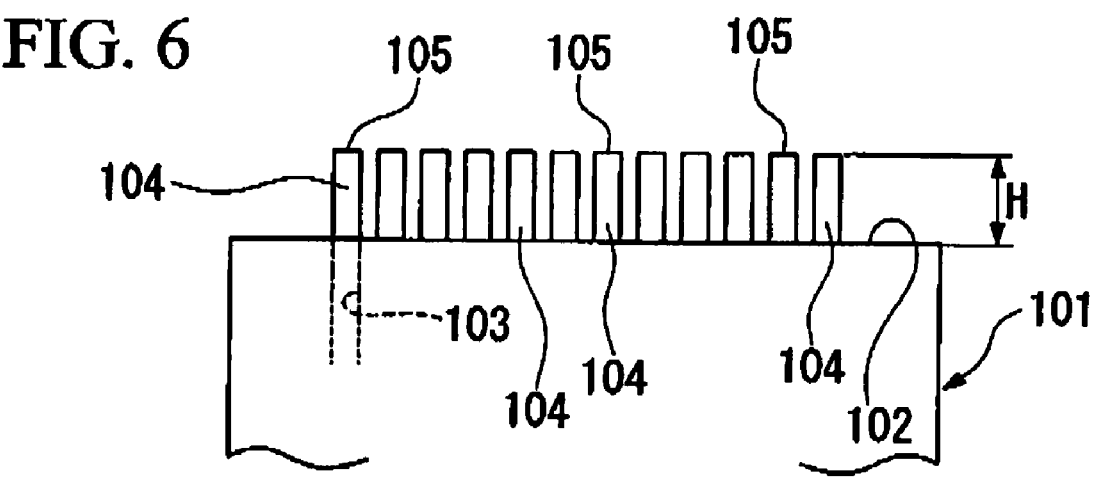
FIG. 6 is a frontal view illustrating a conventional example of an optical connector.
Figure 7:
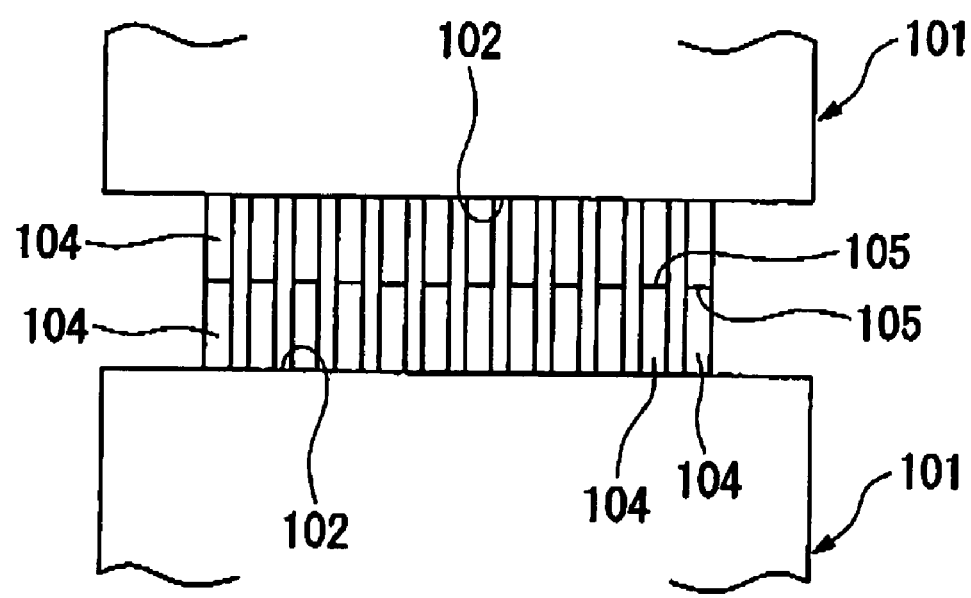
FIG. 7 is a font view illustrating an exemplary, but non-limiting state in which a PC connection is established between the ferrules of FIG. 6.
Figure 8:
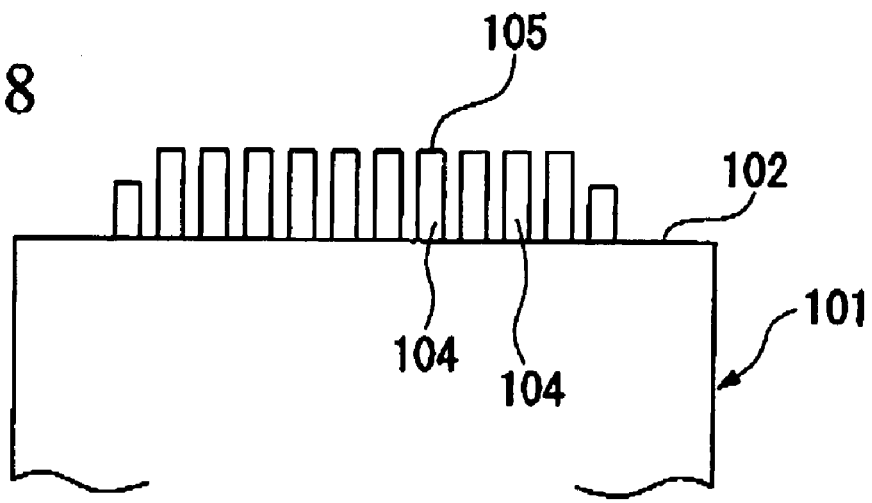
FIG. 8 is a fowl view illustrating a different ferrule of an optical connector in order to demonstrate inconveniences that arise.
Figure 9:
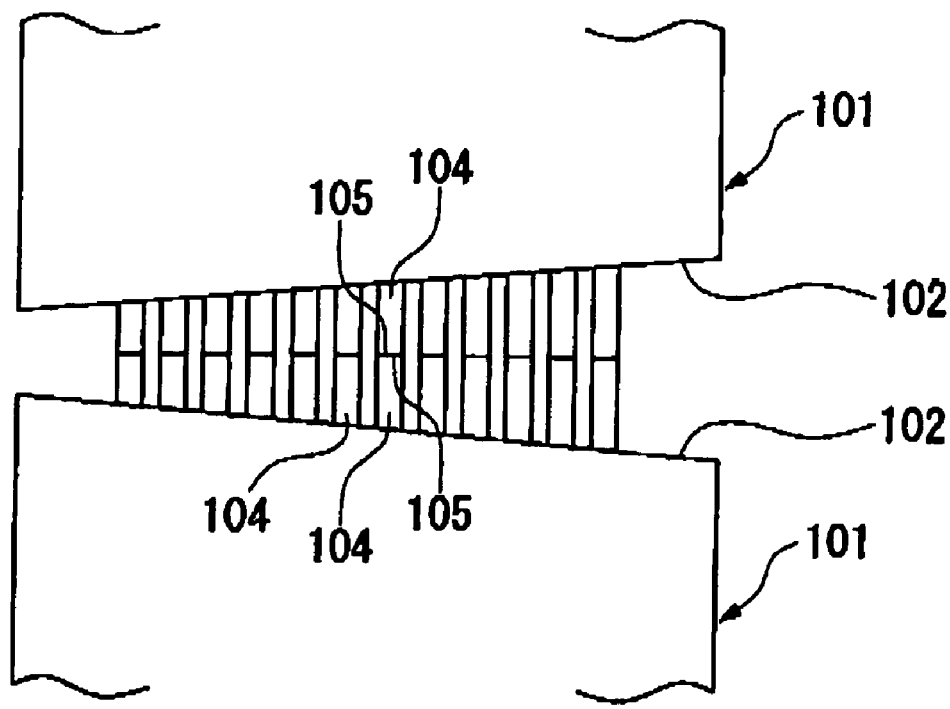
FIG. 9 is a frontal view illustrating a different exemplary, but non-limiting state in which a PC connection is established between the ferrules in order to demonstrate different inconveniences that arise.

As shown in FIGS. 3 and 4, a ferrule 1 includes a junction-end-face 2, a plurality of optical-fiber-insertion holes 3 which open upon the junction-end-face 2, guide pin holes 6 arranged on both sides of the optical-fiber-insertion holes 3, and a flange 7 formed on a rear-end-side opposite the junction-end-face 2.

In the structure shown in FIG. 1, the junction-end-face 2 of the ferrule 1 is a flat surface which intersects orthogonally to a central axis C of the ferrule 1 (a right-angled flat face by grinding or polishing). As described later, the shape of the junction-end-face of this exemplary non-limiting embodiment is not limited to this. Alternatively, the junction-face can be formed into a slanted face or a rounded face.

In this non-limiting exemplary embodiment, openings (apertures) 3a of the optical-fiber-insertion holes 3 are disposed in a line on the junction-end-face 2. There are twelve openings 3a of the optical-fiber-insertion holes 3, However, the invention is not limited to this. The number thereof can be set to any value as long as the subject matter of the present invention can be achieved. For example, there may be four, eight, ten, twelve, sixteen or the like, optical-fiber-insertion holes 3.

Further, as shown in FIGS. 5A to 5D, a ferrule 11 can be employed in which the openings 3a of the optical-fiber-insertion holes 3 are arranged in two or more arrays or in a plurality of arrays in the junction-end-face 2 of the ferrule (e.g., in 12 holes of 2 arrays (24 holes)). As to other patterns, although not shown in the figure, a 12-hole by 3 array (36 holes) pattern, a 12-hole by 5 array (60 holes) pattern, 16-hole by 5 array (80 holes) pattern or the like can be structured. In other words, in the ferrule 11 having the plurality of arrays of the optical-fiber-insertion holes 3, the optical-fiber-insertion holes 3 can be arranged or disposed in various arrangements.

If there are three or more optical-fiber-insertion holes 3 in one array or line, it is possible to make a distinction between optical fibers disposed on both side portions 2s of the junction-end-face 2 and an optical fiber disposed in a central portion 2c of the junction-end-face 2. The present invention may be thereby exemplified. In this non-limiting exemplary embodiment, the central portion 2c of the junction-end-face 2 is an area which at least includes a central axis C, and both of the side portions 2s of the junction-end-face 2 are areas which are opposed to one another and which sandwich the central portion 2c. As described above, the junction face 2 can be divided into the three areas, i.e., the central portion 2c and both of the side portions 2s (the central portion and the left and the right portions in FIG. 1). Each of these three areas includes at least one optical fiber. Each of the two side portions 2s of the junction-end-face 2 includes an outermost side optical fiber 4s.

As shown in FIG. 1, optical fibers 4 are inserted and fixed in each of the optical-fiber-insertion holes 3. Those optical fibers 4 protrude from the junction-end-face 2.

Each optical fiber 4 may be, for example, a silica-based optical fiber with a coating (not illustrated in a figure), such as a single-core coated optical fiber, a multi-core coated optical fiber (a coated optical fiber ribbon or the like) or the like. Prior to inserting the optical fibers, the resin coat (UV-cure-type resin or the like) of the tip end of each of the protruding portions of the optical fibers 4 is peeled or removed so as to expose a bare optical fiber. In this case, the insertion of the optical fibers 4 in their respective optical-fiber-insertion holes 3 can be carded out by, for example, inserting the optical fibers from a rear end portion of the ferrule 1 through an interior space of the ferrule 1 into the respective optical-fiber-insertion holes 3 and pressing the optical fibers until end faces 5 thereof protrude from the junction-end-face 2. By placing a flat plate or the like ahead of the ends of the optical fibers 4, the amount of protrusion of the optical fibers can be flushed.

Further, the optical fibers 4 or the bare optical fibers having short lengths can be used. In this case, the term "short lengths" means that they are shorter than the length of the optical ferrule 1. Preferably, the structure is such that one end of each of the optical fibers exposed through the openings 3a of the optical-fiber-insertion holes 3 and the opposite ends thereof (not shown) are situated within the optical-fiber-insertion holes 3. In the case of the optical fibers 4 having such short lengths, it is possible to position oppositely and optically connect the optical fibers 4 and other optical fibers (other bare optical fibers) such as coated optical fiber ribbon (not shown) inserted from outside of the ferrule, within the optical-fiber ion holes 3.

In the present non-limiting exemplary embodiment, lengths Hs and Ht of the protruding portions (in FIG. 1, respectively indicated by reference numerals 4s and 4t), which protrude from the junction-end-face 2, of the optical fibers 4 are eater than lengths Hc of the protruding portions (in FIG. 1, indicated by reference numeral 4c), which protrude from the junction-end-face 2 and which are situated in the central portion 2c of the junction-end-face 2, of the optical fiber 4. As can be seen from FIG. 1, Hc<Ht<Hs, where the length of outermost portions 4s of the optical fibers 4 is Hs, the length of second-outermost portions 4t of the optical fibers 4 is Ht, and the length of portions situated in the central portion 2c of the junction-end-face 2 is Hc. In this non-limiting exemplary embodiment, the structure is such that the (protruding) length Hs of the outermost protruding portions (4s), which are situate on the outermost side in the junction-end-face, of the optical fibers is the largest and that the (protruding) length of the portions (4t) proximate to the outmost portions (4s) of the optical fibers is larger than those of portions (4c) situated in the central portion (2c) of the junction-end-face (2). In the embodied figures, each of the optical fibers is illustrated to show columnar shape to a tip or end thereof. These illusions are to enable easier understanding of the dimensional relationships among the structural elements. In fact, the tip or end of each of the optical fibers after the polishing operation may have a truncated-cone shape. This applies throughout the specification.

The Japanese Industrial Standards (JIS) define the protruding lengths of optical fibers that assure physical contact (PC) connections. In accordance therewith, the maximum value of the protruding length (Hc, Hs, or Ht) of each of the optical fibers (4c, 4s, or 4t) is appropriately determined. The permissible difference between Hs and Hc may depend on the number of optical fibers 4 (or the number of optical-fiber-insertion holes 3), pressure forces induced between ferrules at the time of connection, and so on. Based on experiments according to various conditions, it can be determined so as to have an optimum value.

The values of the protruding lees Hc, Hs, and Ht may be adjusted when the ends or end faces 5 of the optical fibers 4 and the junction-end-face 2 of the ferrule 1 are polished. Polishing the junction-end-face of the ferrule 1 may be carried out in a polishing machine by use of alumina abrasive, buffing or the like. However, the method is not limited to this. The end faces 5 of the optical fibers 4 prior to polishing may be essentially flush with the junction-end-face of the ferrule 1 prior to polishing. Alternatively, before the polishing operation, the optical fibers 4 may be arranged and fixed by an adhesive such that the optical fibers 4 slightly protrude from the un-polished junction-end-face of the ferrule 1. Selection of a suitable kind of polishing agent or material in consideration of the difference in degrees of hardness between silica-based optical fibers and a resin material forming a ferrule, and to polish them such that the silica-based optical fibers only protrude is generally carried out.

Meanwhile, lengthwise-directional positions of the end faces of the optical fibers 4c, 4s, and 4t can be defined by different means or a reference plane instead of using the protruding lengths of the optical fibers 4c, 4s, and 4t In other words, a reference plane P which intersects the central axis C of the ferrule 1 orthogonally and which is located ahead of the end faces 5 of all of the optical fibers, as seen in the connecting direction, may be assumed. This may be determined based on the distance between the reference plane P and the end faces 4 of the optical fibers 4.

In the present non-limiting exemplary embodiment, the inequality "Dc>Dt>Ds" holds true wherein Dc designates the distance between the reference plane P and the end face 5 of the optical fiber 4c situated in the central portion 2c of the junction-end-face 2, Ds designates the distance between the reference plane P and the end face 5 of the optical fiber 4s, and Dt designates the distance between reference plane P and the end face 5 of the optical fiber 4t. As can be seen from the above, the end faces 5 of the optical fibers 4s, 4t disposed on both of the side portions 2s are positioned so as to be closer to the reference plane P among those of the other remaining optical fibers 4c.

FIG. 1 is a typical view explaining an non-limiting exemplary embodiment of the present invention and is not intended to limit the invention. For example, the provision in which there are four optical fibers (4s, 4t, 4t, 4s), two at each side portion (2s) of the junction-end-face 2, the protruding lengths (Hs, Ht) of the four optical fibers (4s, 4t, 4t, 4s) being larger than the protruding lengths (Hc) of the optical fibers 4c disposed on the central portion 2c of the junction-end-face 2, is neither a limitation to, nor a requirement of, the present invention. In this non-limiting exemplary embodiment, the optical fiber 4s of each outermost side is the largest. The present invention may not be limited to this. For example, a structure is possible in which the optical fibers (4t, 4t) each positioned at respective second outermost sides have the largest protruding lengths among the rest. In short, a structure is sufficient in which the optical fibers (4t, 4t) are disposed on both of the side portions 2s of the junction-end-face 2 and have protruding lengths greater than those of the optical fibers (4c) disposed on the central portion 2c of the junction-end-face 2. It is not necessary that all the optical fibers on the both side portions 2s have protruding lengths, which are greater than those of the optical fibers 4c disposed on the central portion 2c. The differences in protruding lengths between the optical fibers disposed on the central portion and on the side portions may be approximately 1 μm or lower.

With the optical connector as structured above, when both ferrules 1 of FIG. 1 are provided in opposed positions and then the end faces 5 of the optical fibers 4 are pushed toward one another, it nay be possible to achieve a PC connection of the optical fibers 4 since there is no gap (dip or slack) between each of the end faces 5 of the optical fibers as shown in FIG. 2. The reason is that, when the junction-end-faces 2 of the pair of ferrules 1 are arranged so that end faces 5 of the optical fibers 4 are opposed to one another, pressure forces of several kilograms are generated and applied to the end faces, and then, the end faces 5 of both of the optical fibers 4 are adjusted or aligned such that there is no gap (dip or slack) between the end faces 5 of the optical fibers 4 due to a combination of factors such as deformation of materials such as the resin material forming a ferrule, an adhesive filled between a periphery of the optical fiber 4 and an inner surface of an optical-fiber-insertion hole 3, and glass forming the optical fiber 4. Pressure forces, which may be generated between an optical fiber end face and a corresponding optical fiber end face, vary from fiber to fiber. It is possible that the greater the prong lengths of the optical fibers 4 are, the greater the pressure forces being generated between the end faces of the optical fibers 4 are. Additionally, in FIG. 2, front ends of the optical fibers (4s and 4t) disposed on both of the side portions are illustrated with hatchings 8 in order to diagrammatically indicate the fact that pressure forces generated between the end faces 5 of the optical fibers increase. In other words, an area to which large pressure forces are applied to by the end faces 5 of the optical fibers 4 is formed on both of the side portions 2s of the junction-end-face 2.

As a result, even if external forces such as vibrations are applied to the optical connector, a PC connection thereof may not be disconnected, and further, it may be possible to maintain stable optical characteristics while restricting problems related to an increase of optical loss, connection removal and so forth.

The present invention has been described and explained with reference to the above-mentioned non-limiting exemplary embodiments and is not limited thereto. Modification is possible in several ways without departing from the scope of the present invention.

For example, the shape of the ferrule should not be construed as a limiting factor of the present invention. For example, ferrules for a multifiber push-on (MPO) type optical multifiber connector defined in JIS C 5982 and so forth, and ferrules for a Mini-MPO type multifiber connector defined in JIS C 5984 and so forth may be used. Optical connectors using such ferrules are characterized in that they are positioned and connected by means of a pair of guide pins. The preset invention can be applied to any ferrules that are incorporated in any optical connectors using such a positioning arrangement. It is also possible to achieve positioning by means of a housing structure without using such a guide pin. In the case of a PC connection being implemented, the present invention can be applied regardless of the positioning means used.

As long as the provision in which optical fibers are provided so as to protrude from a junction-end-face of a ferrule is achieved, the configuration after polishing of the junction-end-face of the ferrule is spherical (spherical-surface polishing), normal (normal-surface polishing), slanted (slant-surface polishing) or the like (combined polishing), although it is not especially limited these. Typically, such slant-surface polishing is used when implementing a PC connection.

If a junction-end-face of a ferrule is spherical or curved after pond, a position of a tip or end (or a protruding length) of each optical fiber can be appropriately determined by and following an arbitrary reference plane that is positioned forward, in the connecting direction (a direction in which the optical fibers protrude from the junction-end-face of the ferrule), of end faces of the optical fibers, the arbitrary reference plane being perpendicular to a central axis of the ferrule. In other words, by polishing the end faces of the ferrule and the optical fibers in such a manner that positions of the tips of the optical fibers disposed on both of the side portions of the junction-end-face are closer to the reference plane than positions of the tips of the optical fibers disposed on a central portion of the junction-end-face, structure may be possible in which protruding lengths of the optical fibers disposed on the both side portions of the junction-end-face are greater than those of the optical fibers disposed on the central portion of the junction-end-face. Therefore, a large pressing force is exerted between each of the end faces of the optical fibers disposed at each end side in the junction-end-face of the ferrule, whereby the reliability of the PC connection may be achieved.

Figure 10A:
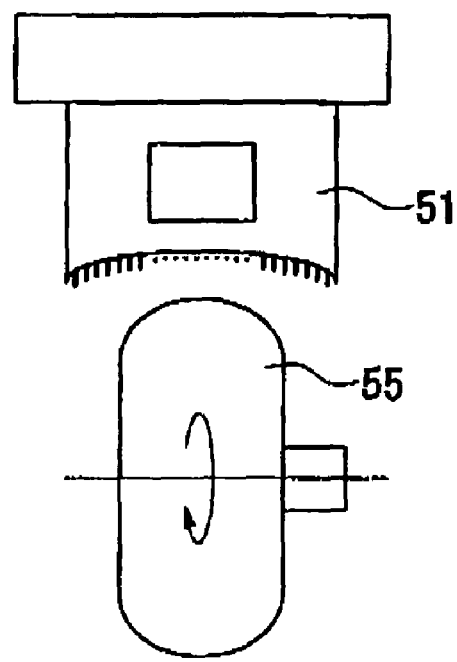
FIGS. 10A and 10B are views illustrating manufacturing processes of an optical connector according to an exemplary non-limiting embodiment the present invention.
Figure 10B:
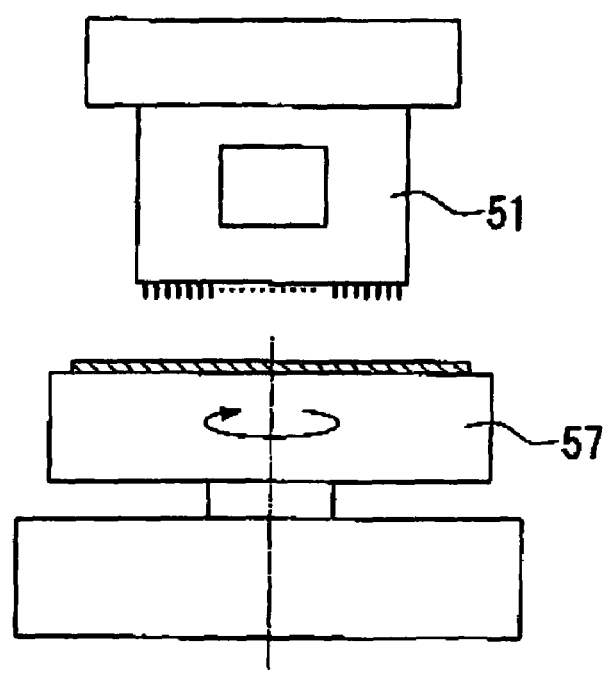

Finally, with reference to FIGS. 10A and 10B, an example of a manufacturing procedure of an optical connector according to a non-limiting exemplary embodiment of the invention will be briefly described hereinafter.

Primarily, a ferrule 51 in which optical fibers are inserted and fixed is provided. In the ferrule 51, portions of the optical fibers protrude so as to be exposed, each portion having a predetermined protruding length. The ferrule is subjected to a rough cutting by a precision grinder 55. Thus, the ferrule 51 having a hollow or depressed shape center part can be obtained (see FIG. 10A).

Next, the ferrule is subjected to a precise polishing by a polishing machine 57. Resultingly, the ferrule 51 (optical connector) according this non-limiting exemplary embodiment may be obtained.

In various kinds of technical fields including optical communications and so forth, multifiber optical connectors according to the non-limiting exemplary embodiments may be used to implement connector connections of optical fibers.

While the invention has been particularly shown and described with reference to the non-limiting exemplary embodiments thereof, the present invention is not limited to the embodiments. Note that without departing from the scope of the invention, it is possible for a person having ordinary skill in the art to make additions, deletions, replacements and other alterations. The scope of the invention is not limited by the detailed description of the specific embodiments, but is only defined by the claims appended hereto, and their equivalents.

What is claimed is:

1. A multifiber optical connector, comprising:
    a ferrule comprising a junction-end-face and a plurality of optical-fiber-insertion holes which open in the junction-end-face;
    openings of the optical-fiber-insertion holes arranged on the junction-end-face; and
    optical fibers which are received and fixed in the optical-fiber-insertion holes and then polished such that, on a reference plane "P" which intersects orthogonally a central axis "C" of the ferrule, which is disposed at a front side, in the connecting direction, of ends of the optical fibers, and by which positions of tips of the optical fibers are calculated and determined, a position of one of the tips of the optical fibers disposed on each side of side portions of the junction-end-face is closer to the reference plane "P" than a position of one of the tips of the optical fibers disposed on a central portion of the junction-end-face.

2. The multifiber optical connector according to claim 1, wherein said openings of the optical fiber insertion holes are arranged in at least one line or in plural parallel lines.

3. The multifiber optical connector as recited in claim 1, wherein an optical fiber which is disposed at an outer-most end side of said junction-end-face has a tip that is closest to the reference plane P among those of the remaining optical fibers.

4. The multifiber optical connector as recited in claim 1, wherein a first optical fiber of an outermost fiber protrudes a length $H_s$ from the junction-end-face, a second optical fiber adjacent to the first optical fiber protrudes a length $H_r$ from the junction end-face, and a third optical fiber adjacent to the second optical fiber protrudes a length $H_c$, such that the following relationship is satisfied, $H_s > H_r > H_c$.

* * * * *